(12) United States Patent
Van Veldhuizen et al.

(10) Patent No.: US 11,352,688 B2
(45) Date of Patent: Jun. 7, 2022

(54) METHOD OF MANUFACTURING A CONTINUOUS HOT DIP COATED STEEL STRIP AND HOT DIP COATED STEEL SHEET

(71) Applicant: TATA STEEL IJMUIDEN B.V., Velsen-Noord (NL)

(72) Inventors: Hendrik Bart Van Veldhuizen, Noordwijk (NL); Jurgen Wilhelmus Vrenken, Haarlem (NL); Edgar Matthijs Toose, Hoofddorp (NL); Mattheüs Hendrik Marinus Huisert, Haarlem (NL); Petrus Cornelis Jozef Beentjes, Castricum (NL); Jan Bottema, Santpoort-Zuid (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 261 days.

(21) Appl. No.: 16/614,914

(22) PCT Filed: May 25, 2018

(86) PCT No.: PCT/EP2018/063850
§ 371 (c)(1),
(2) Date: Nov. 19, 2019

(87) PCT Pub. No.: WO2018/215661
PCT Pub. Date: Nov. 29, 2018

(65) Prior Publication Data
US 2020/0173003 A1    Jun. 4, 2020

(30) Foreign Application Priority Data
May 25, 2017    (EP) .................................... 17172977

(51) Int. Cl.
*C23C 2/06* (2006.01)
*C23C 2/02* (2006.01)
(Continued)

(52) U.S. Cl.
CPC .................. *C23C 2/06* (2013.01); *B32B 1/00* (2013.01); *B32B 3/26* (2013.01); *B32B 15/01* (2013.01);
(Continued)

(58) Field of Classification Search
CPC ......... C23C 30/00; C23C 30/005; C23C 2/06; C23C 2/02; C23C 2/20; C23C 2/40;
(Continued)

(56) References Cited

U.S. PATENT DOCUMENTS

2009/0025836 A1    1/2009  Bello et al.
2018/0002797 A1*   1/2018  Oh ............................ C23C 2/40

FOREIGN PATENT DOCUMENTS

GB    2110248 A    6/1983
GB    2517622 A    2/2015
(Continued)

OTHER PUBLICATIONS

International Search Report and Written Opinion dated Jun. 18, 2018 for PCT/EP2018/063850 to Tata Steel Ijmuiden B.V. filed May 25, 2018.

*Primary Examiner* — Michael E. La Villa
(74) *Attorney, Agent, or Firm* — Vorys, Sater, Seymour and Pease LLP

(57) ABSTRACT

A method of manufacturing a hot dip coated steel strip, wherein coating takes place by leading the strip through a bath of molten metal including Al, the remainder of the metal being Zn, inevitable impurities and optionally a maximum of 0.3% of one or more additional elements, wherein (Continued)

the composition of the bath is controlled so as to have an aluminium content of more than 0.50%.

40 Claims, 9 Drawing Sheets

(51) Int. Cl.
| | |
|---|---|
| C23C 2/40 | (2006.01) |
| C22C 38/04 | (2006.01) |
| C22C 38/00 | (2006.01) |
| C22C 38/02 | (2006.01) |
| C22C 38/48 | (2006.01) |
| C22C 38/42 | (2006.01) |
| C22C 38/06 | (2006.01) |
| C22C 38/52 | (2006.01) |
| C22C 38/50 | (2006.01) |
| C22C 38/46 | (2006.01) |
| C22C 38/44 | (2006.01) |
| C22C 38/54 | (2006.01) |
| B32B 15/01 | (2006.01) |
| C22C 18/04 | (2006.01) |
| C23C 2/20 | (2006.01) |
| C23C 28/02 | (2006.01) |
| C22C 18/00 | (2006.01) |
| B32B 15/04 | (2006.01) |
| C23C 30/00 | (2006.01) |
| C23C 2/28 | (2006.01) |
| C23C 2/26 | (2006.01) |
| B32B 15/18 | (2006.01) |
| B32B 3/26 | (2006.01) |
| B32B 1/00 | (2006.01) |

(52) U.S. Cl.
CPC .......... *B32B 15/013* (2013.01); *B32B 15/016* (2013.01); *B32B 15/04* (2013.01); *B32B 15/043* (2013.01); *B32B 15/18* (2013.01); *C22C 18/00* (2013.01); *C22C 18/04* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C23C 2/02* (2013.01); *C23C 2/20* (2013.01); *C23C 2/26* (2013.01); *C23C 2/28* (2013.01); *C23C 2/40* (2013.01); *C23C 28/021* (2013.01); *C23C 28/023* (2013.01); *C23C 28/025* (2013.01); *C23C 28/028* (2013.01); *C23C 30/00* (2013.01); *C23C 30/005* (2013.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/2495* (2015.01); *Y10T 428/24967* (2015.01); *Y10T 428/26* (2015.01); *Y10T 428/27* (2015.01)

(58) Field of Classification Search
CPC .......... C23C 2/26; C23C 2/28; C23C 28/021; C23C 28/028; C23C 28/025; C23C 28/023; B32B 15/013; B32B 15/01; B32B 15/04; B32B 15/043; B32B 15/016; B32B 15/18; B32B 3/26; B32B 1/00; C22C 18/00; C22C 18/04; C22C 38/001; C22C 38/002; C22C 38/008; C22C 38/02; C22C 38/04; C22C 38/06; C22C 38/42; C22C 38/44; C22C 38/46; C22C 38/48; C22C 38/50; C22C 38/52; C22C 38/54; Y10T 428/12799; Y10T 428/12951; Y10T 428/12958; Y10T 428/12965; Y10T 428/12972; Y10T 428/12993; Y10T 428/2495; Y10T 428/24967; Y10T 428/26; Y10T 428/27
See application file for complete search history.

(56) References Cited

FOREIGN PATENT DOCUMENTS

| | | |
|---|---|---|
| JP | H059689 A | 1/1993 |
| WO | 8909844 A1 | 10/1989 |
| WO | 2007048883 A1 | 5/2007 |
| WO | WO 2016105163 * | 6/2016 |

* cited by examiner

METHOD OF MANUFACTURING A CONTINUOUS HOT DIP COATED STEEL STRIP AND HOT DIP COATED STEEL SHEET

CROSS-REFERENCE TO RELATED APPLICATIONS

This is a § 371 National Stage Application of International Application No. PCT/EP2018/063850 filed on May 25, 2018, claiming the priority of European Patent Application No. 17172977.5 filed on May 25, 2017.

This invention relates to a method of manufacturing a continuous hot dip coated steel strip as well as to a hot dip coated steel sheet.

A method of manufacturing a continuous hot dip coated steel strip by galvanising as well as a hot dip coated steel sheet in the form of a galvanised steel sheet is widely known throughout the iron and steel industry.

Continuous hot dip coating processes for the production of steel sheet products are widely used and employed everywhere in the world. Hot dip coating was originally developed for galvanising (zinc-coating) but is now also used to apply other metals to steel sheet. The method has become a very sophisticated operation.

Originally the product was used for applications that did not demand a high quality finish or a high degree of formability, but in recent times hot dip coated steel sheets are increasingly used for more demanding applications such as for automotive hoods, fenders and doors. These applications are more demanding regarding formability and resulting surface quality. Hot dip coated sheet is produced in thicknesses from 0.25 to 4.50 mm.

In continuous hot dip coating the steel strip is passed as a continuous ribbon through a bath of molten metal at speeds of up to 200 m/min. In the molten metal bath the steel strip reacts with the molten metal and the coating bonds onto the strip surface. The strip passes one or more submerged rolls and exits the bath in a vertical direction. Just above the exit point a set of gas knives wipes off excess molten metal allowing a controlled thickness of coating usually expressed as weight of coating per unit area on the strip surface. After cooling the strip feeds into the exit end often comprising a temper mill (skin pass mill). As wiping gas air or nitrogen gas can be used. For producing higher quality coated products normally nitrogen gas is used.

It is important for the steel and zinc to form a proper bonding zone which is usually accomplished by adding to the bath a controlled amount of aluminium of approximately 0.15% to 0.20% (all percentages herein are weight %) and controlling the temperature of the steel sheet at the point where it enters the bath in combination with the temperature of the bath.

The resulting coating is essentially a zinc coating that contains aluminium, typically between 0.20% and 0.30%. That this aluminium amount is higher than that in the bath is because aluminium has a greater affinity for iron than zinc. Immediately after the steel enters the zinc bath an aluminium-iron layer, a so called inhibition layer, is formed so that aluminium concentrates at the steel zinc interface.

As indicated above, nowadays applications of galvanised steel sheet apart from formability need to fulfil surface quality requirements. A conventional method to improve the surface quality of a hot dip galvanised steel substrate is disclosed in GB-A-2517622. This publication mentions that galvanised metal sheets have what is called a waviness of their outer surfaces, which could previously only be compensated by significant thicknesses of paint, under the penalty of having a so-called "orange peel" aspect, unacceptable for e.g. automotive body parts.

According to GB-A-2517622 the composition of the bath is based on zinc and contains between 0.1 and 0.5% by weight of aluminium, preferably between 0.1 and 0.4%, and still preferably between 0.1 and 0.3%. Further, if certain parameters are set in accordance with requirements, conditions and equations, this would give the possibility of attaining, after solidification of the coating and before a possible skin-pass, a waviness Wa 0.8 of less than or equal to 0.55 µm or in an embodiment less than or equal to 0.35 µm.

It is an objective of this invention to provide an improved hot dip coating method.

It is also an objective of this invention to provide an improved hot dip coated steel.

These objectives are achieved according to the independent claims. Preferred embodiments are defined in the respective dependent claims. It should be noted that the features listed in the claims can be combined in any technically meaningful manner to describe further embodiments of the invention. The following specification explains the features of the inventions and may suggest additional embodiments of the invention.

According to the invention, the method is characterized in that the composition of the bath is controlled so as to have an aluminium content of more than 0.50%.

When using the method according to the invention surprisingly on the one hand an operation for hot dip coating is realised that is much more stable than conventional hot dip galvanising and on the other hand a superior hot dip coated steel may be obtained having excellent properties, especially also as regards the resulting surface.

As indicated above, small amounts of aluminium are conventionally present in the zinc bath of a conventional continuous galvanising line in order to bring about the formation of a (mainly) iron-aluminium based interface layer between the steel substrate and the molten zinc, the layer being called inner layer in this patent application which is generally also referred to as the inhibition layer. When investigating the formation of this layer and its dependence on aluminium, it was found by the inventors that at the conventional aluminium concentrations in the zinc bath, the aluminium content in the inhibition layer is highly dependent on both the temperature of the strip when entering the bath (strip entry temperature, SET) and the aluminium concentration in the zinc bath. Conversely it was found that at higher aluminium concentrations in the zinc bath, in particular at >0.50% Al, the aluminium content in the inhibition layer is surprisingly completely SET independent.

As the inventors investigated this matter further, it was found that at an aluminium content of more than 0.5%, in particular around 0.55% or 0.6%, the aluminium content in the inhibition layer becomes not only SET independent, but largely also independent from variations in the Al concentration in the zinc bath.

It was thus found that if one steps away from conventional galvanising and instead works according to the invention, a very stable thin inhibition layer is formed, without variations adversely affecting product quality in aspects such as spot weldability, zinc adhesion and galling behaviour of the hot dip coated product. The inventors also realised that in conventional galvanising there is a considerable sensitivity of the inhibition layer for the process settings of the galvanising line e.g. in that the relatively low aluminium content in the zinc bath causes that the inhibition layer is not always completely closed and will not be able to at all locations fully prevent the (further) dissolution of iron from the steel substrate into the zinc bath. In contrast, if the method according to the invention is practised, less iron will dissolve in the zinc which in turn leads to less dross formation, less contamination, less surface defects and less high spots.

The inventors have found that due to the relatively low aluminium concentration in the bath of between 0.15 and 0.20% in conventional hot dip galvanising, depletion may occur of aluminium in a thin layer next to the steel strip. It takes some time to close the barrier provided by the $Fe_2Al_5$ inhibition layer. It may be for this reason that in conventional galvanising iron can still dissolve next to the inhibition crystals, and the inhibition layer thickness becomes thicker. In conventional galvanising baths having low aluminium concentrations of 0.15% to 0.20% the iron dissolution rate, the iron solubility and the amount of metallic dross particles formed is quite high. These metallic dross particles are partly removed by top dross removal practice, another part of the metallic dross particles deposit on bath hardware like rolls and still another part of the metallic dross particles will be embedded in the zinc coating.

The deposition of metallic dross particles on bath hardware causes wear of bearings and decreases the quality of the galvanised strip surface by causing repetitive imprints by rolls and bad control of strip vibration. Further, metallic dross particles are also found in the zinc coating. These metallic dross particles are sometimes visible on the strip surface since they result in a deviant wiping pattern (surface defect). Some metallic dross particles remain invisible and are therefore not recorded by surface inspection. Then, these particles form a concern, because they may show up in a press shop as small and shiny spots (so called high spots) and are a cause for rejection. It is therefore clear that the presence of metallic dross particles in the bath should be avoided as much as possible.

According to an aspect of the invention, a method of manufacturing a hot dip coated steel strip is proposed, wherein coating takes place by leading the strip through a bath of molten metal comprising Al, the remainder of the metal being Zn, inevitable impurities and a maximum of 0.3% of one or more additional elements.

The one or more additional elements may be selected from Si, Sb, Pb, Ti, Ca, Mn, Mg, Sn, La, Ce, Cr, Zr or Bi. Small amounts of these elements may be added to the bath.

The composition of the bath may be controlled so as to have an aluminium content of 0.55% or more or of 0.60% or more. As mentioned above this has advantages for stable operation as well as for the product that is manufactured.

The composition of the bath may be controlled so as to have an aluminium content of 0.9% or less or 0.8% or less. As mentioned above this is advantageous for production and product.

In order to understand the final properties of the product developed in this invention we need to take into account what happens during solidification. To this end we consider the phase diagram of aluminium—zinc. During the cooling of the liquid zinc coating after it leaves the bath, zinc is segregated first, followed by aluminium and the remainder of the zinc in case the aluminium percentages are below 1.1% as can be seen from the phase-diagram. At higher aluminium percentages ZnAl phases may be formed (the β phase in the phase-diagram), which are unwanted as they can deteriorate the surface quality. Even under non-equilibrium situations, as is the case for the typical very high cooling rates of the coating during wiping, ZnAl phases were found at Al percentages of lower than 1.1%.

Dependent on line conditions and especially at low line speeds and late cooling ZnAl phases could be made at lower Al % as diffusion could take place. Because of this it is better to keep the aluminium percentage at 0.9% or below, or even better at 0.8% or below to ensure no significant amounts of ZnAl phases are generated.

The Fe-content in the bath, as a result from possible dissolution of iron during submersion of the strip in the bath, may be less than 70 ppm, preferably less than 50 ppm, more preferably less than 30 ppm, most preferably less than 20 ppm. The inventors have realised that it is now possible to decrease the dissolution of iron at the moment of submersion of the strip in the zinc bath, namely by having a higher aluminium content in the zinc bath. This way, the critical aluminium depletion near the strip surface is avoided and the $Fe_2Al_5$ inhibition layer immediately starts to be a true barrier at the earliest moment so that iron dissolution into the bath is dwindled. Furthermore, it has been found that surprisingly the inhibition layer formed remains thinner, that is to say, its growth comes to a halt because any defects in the coating that would allow any dissolution of iron are repaired swiftly.

All this goes against the prejudice that a higher aluminium concentration in the zinc bath leads to more dross particles, since the equilibrium: $2Fe+5Al \Longleftrightarrow Fe_2Al_5$ is pushed to the right by the addition of aluminium. Contrary to this it has occurred to the inventors that as a matter of fact the addition of more aluminium causes less iron to be dissolved from the steel strip into liquid zinc and therefore the amount of metallic dross particles is limited. Moreover this is a very stable situation: As long as the amount of dissolved aluminium remains "in excess", the amount of iron is low and remains low.

Typical SET temperatures in the process range from 420° C.-490° C., preferably 450° C.-470° C.

The method may comprise the steps of leading the strip to the exit of the bath via a roll below the surface level of the bath and wiping the strip leaving the bath with at least one gas knife projecting through at least one outlet a wiping gas on the coated steel strip, which has the feature that the parameters D, HS and US are selected such that $D*\ln(HS*US) \leq 130$, wherein D is the shortest distance of the outlet of the gas knife to the surface of the strip in mm, HS is the height of the gas knife above the surface of the bath in mm, US is the distance between the upper edge of the roll and the surface of the bath in mm. Setting the parameters in this way enables excellent hot dip coating especially regarding the surface properties, in particular the waviness of the hot dip coated steel. It is remarked here that the gas knives generally have a slit shaped substantially rectangular outlet with an average slit width of 0.8 to 1.3 mm.

The value of $D*\ln(HS*US)$ may be 120 or less, preferably 110 or less, more preferably 100 or less, more preferably 90 or less, more preferably 80 or less, most preferably 70 or less. This is a further measure whereby the hot dip coating is adapted so as to realise a superior hot dip coated steel.

The method may comprise the step of wiping the strip leaving the bath with at least one gas knife projecting through at least one outlet a wiping gas on the coated steel strip, wherein hot dip coating and wiping are conducted in such a way that $$[(P-24) \div (5.95 D^{0.96} V^{1.39})]^{-0.81} \leq 150,$$

wherein P is the wiping pressure in the gas knife in mbar, D is the shortest distance of the outlet of the gas knife to the surface of the strip in mm and V is the speed of the strip in m/min.

In an aspect the method has the feature that $$[(P-24) \div (5.95 D^{\wedge} 0.96 V^{\wedge} 1.39)]^{\wedge}-0.81 \leq 100,$$

$$[(P-24) \div (5.95 D^{\wedge} 0.96 V^{\wedge} 1.39)]^{\wedge}-0.81 \leq 70,$$

preferably in that $[(P-24) \div (5.95 D^{\wedge} 0.96 V^{\wedge} 1.39)]^{\wedge}-0.81 \leq 60.$ If these conditions are satisfied thinner hot dip coating layers can be applied whilst attaining excellent surface characteristics. Coating weights of less than 70 g/m² are preferred, and coating weights of less than 60 g/m² are more preferred. The resulting hot dip coated products require less zinc and are lighter (e.g. up to approx. 1%). Further, lower coating weights lead to better weldability as well as waviness.

D may be equal or less than 9 mm, preferably equal or less than 8 mm and more preferably equal or less than 7 mm. With smaller values of D it is possible to improve the hot dip coating process and the products manufactured, although for practical reasons it is clear that there will always need to be a certain minimum distance between the strip and the wiping apparatus. As it turns out, the smaller the distance is, the lower the pressure in the manifold of the wiping apparatus can be, which is believed to lead to less disturbance of the "wet" coating surface, which in turn is better for the resulting (lower) waviness.

HS may be is 550 mm or less, preferably 400 or less, preferably 300 mm or less, more preferably 250 mm or less, and even more preferably 200 mm or less. It was found that lower values for HS render better results as regards waviness of the hot dip coated product. As a minimum value 115 mm may be mentioned, below which a complicated and undesired flow pattern in and near the surface of the bath may occur.

Before it is hot dip coated the steel strip may be cold rolled in a cold rolling mill having a mill stand with a pair of work rolls having a predefined roughness Ra. The method has the feature that Ra is 4.5 μm or less, preferably 1.5 μm or less, more preferably 0.6 μm or less. This roughness and thus the surface of the strip before it is hot dip coated plays a role in the quality that the end product may have. This has to do with the sagging behaviour of the molten coating material travelling upwards after it has passed the wiping apparatus.

According to a further aspect a hot dip coated steel is proposed, comprising a steel substrate and a Zn—Al coating layer, said Zn—Al coating layer comprising an inner layer immediately adjacent the steel substrate and an outer layer extending between the surface layer of the coated steel and the inner layer, characterized in that the aluminium content in the outer layer is in the range of 0.4-1.0% and in that the aluminium content of the total Zn—Al coating layer is 0.71-0.95%. Such a product has all the advantages mentioned above and below, and is a product that surprisingly exceeds the quality of conventional hot dip galvanised steel especially where it regards automotive applications. The inner layer corresponds to the inhibition layer formed upon initial contact of the steel with the molten metal as described in the introduction and the outer layer extends between the surface layer of the coated steel and the inner layer as is further explained in the following also referring to the respective figures.

It should be noted that features described in connection with the proposed method of manufacturing a hot dip coated steel strip can be used to further explain the features of the proposed hot dip coated steel and vice versa.

The proposed hot dip coated steel may be manufactured by and/or a product of the proposed manufacturing method and is a product especially suitable for automotive purposes and in particular for full finish (exposed) purposes, such as use for automotive body panels that have superior paint appearance.

In an aspect the hot dip coated steel has the feature that the coating layer comprises Al, the remainder of the coating layer being Zn, inevitable impurities and optionally<0.3% of one or more additional elements. Although other elements may be contained in the coating, this product has a zinc based coating with some aluminium, the aluminium content being substantially higher than in the conventional hot dip galvanised steels.

The one or more additional element(s) may be selected from Si, Sb, Pb, Ti, Ca, Mn, Mg, Sn, La, Ce, Cr, Zr or Bi. This defines the additional elements in more detail.

The Fe-content in the outer layer may be less than 70 ppm, preferably less than 50 ppm, more preferably less than 30 ppm and most preferably less than 20 ppm. The lower the Fe-content, the fewer small dross particles are incorporated in the coated zinc alloy layer which may affect the appearance of the coated steel This is particularly significant for steels from which exterior automotive parts are shaped by pressing. The included hard particles may cause inhomogeneous deformation resulting in surface defects and irregularities such as tiny projections and bulges, even when present at the non-exposed side of the automotive parts. The unevenness of the surface results in undesired reflections ("shiny spots") and thus the appearance is affected in an unacceptable way. This phenomenon is also indicated as "high spot" defects.

The inner layer may have an aluminium content of less than 150 mg/m² [milligram per square meter] and preferably of less than 120 mg/m². These values represent that the inner layer immediately adjacent the steel substrate is thin leading to improved weldability. Further a thinner inner layer is more stable. Finally, the coating layer is less susceptible to cracking. In relation to the experiments described elsewhere and FIG. 2 it is remarked that the values for the aluminium content in practical cases is slightly higher. This means that values of less than 165 mg/m2 are preferred.

The inner layer may have an average thickness of 500 nm or less, preferably 300 nm or less, more preferably 200 nm or less, most preferably 100 nm or less.

The aluminium content of the whole coating layer may be in the range of from 0.71% to 1.1% which will minimise the presence of $Fe_2Al_5$ particles in the bath as well as in the coating layer.

The aluminium content of the whole coating layer may be 0.75% or more. This will even further reduce the said particles.

The aluminium content of the whole coating layer may be 0.90% or less and possibly 0.86% or less. This reduces the Zn—Al phases in the whole hot dip coating layer.

All these steels according to the invention were found to perform very well.

The outer surface of a 5% bi-axially deformed cup-like article made from the coated steel may have a Wsa measured in the rolling direction of 0.35 μm or less. Low waviness as according to this feature is important in automotive applications where the appearance needs to be appealing such as on the outer side of a body panel. The waviness Wsa as mentioned herein is defined in standard SEP 1941: 2012, 'Measurement of the waviness characteristic value Wsa (1-5) on cold rolled metallic flat products'.

The outer surface of a 5% bi-axially deformed cup-like article made from the coated steel may have a Wsa measured in the rolling direction of 0.30 μm or less, preferably of 0.25 μm or less. These are preferred values for critical applications such as outer panels of cars.

The invention will now be explained further by means of the following non-limiting figures and examples. Explanations and features disclosed in or in connection with the figures (only) can be extracted separately and combined with any other feature as far as not explicitly excluded herein.

Figure 10:
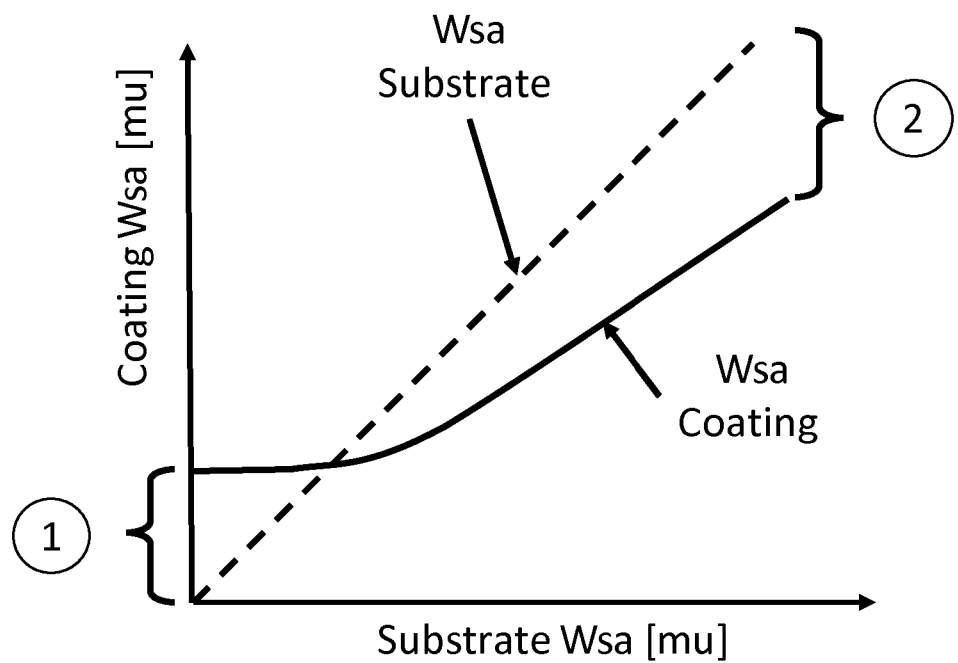
Figure 11:
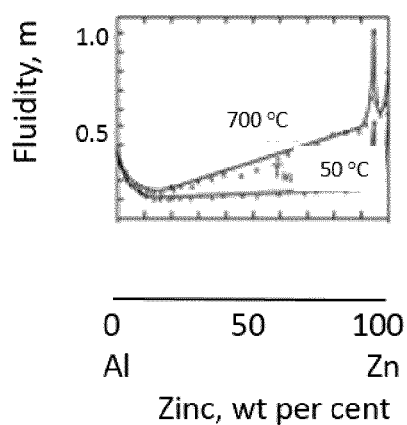

FIG. 10 schematically shows the final waviness of the coating before the temper mill;

FIG. 11 shows the fluidity for zinc—aluminium alloys, and

Figure 12:
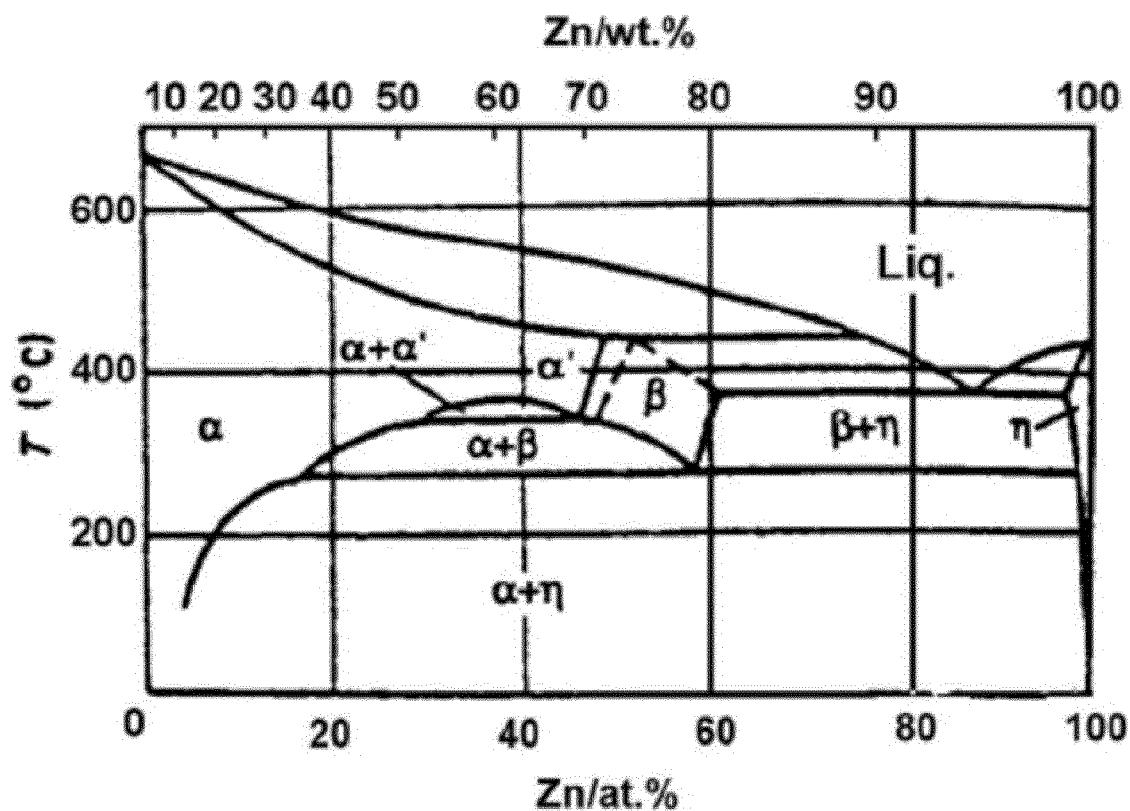

FIG. 12 shows a phase diagram of Zn and Al.

Al in Zn

Figure 1:
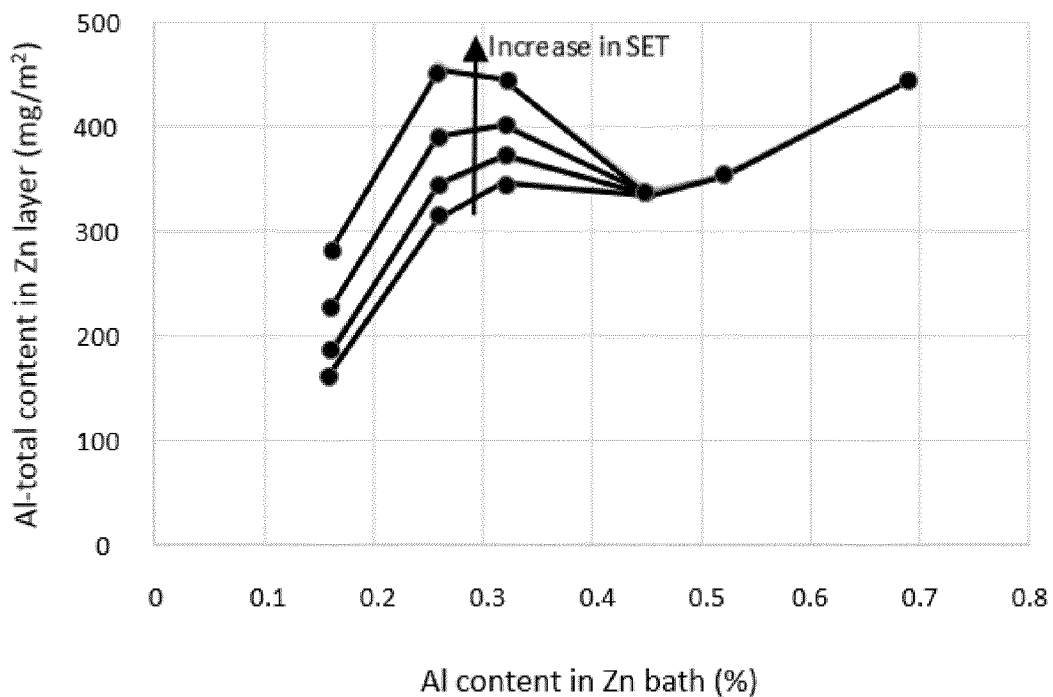
FIG. 1 shows what the inventors found regarding the Al-total content in the zinc layer as a function of the SET and the aluminium content in the zinc bath.

The inventors have performed extensive investigations regarding the dependence of the properties of hot dip coated products on hot dip coating variables. One set of results can be seen in FIG. 1 where in an experimental setting, the Al-total content in the total hot dip coating layer is shown as a function of the SET and the aluminium content in the zinc bath. It is clear from these results that with higher Al content in the Zn bath, Al-total in the coating layer of the resulting hot dip coated steel becomes independent of the SET. Typical SET temperatures tested were in the range of 300-600° C.

Al in Inner Layer

Figure 2:
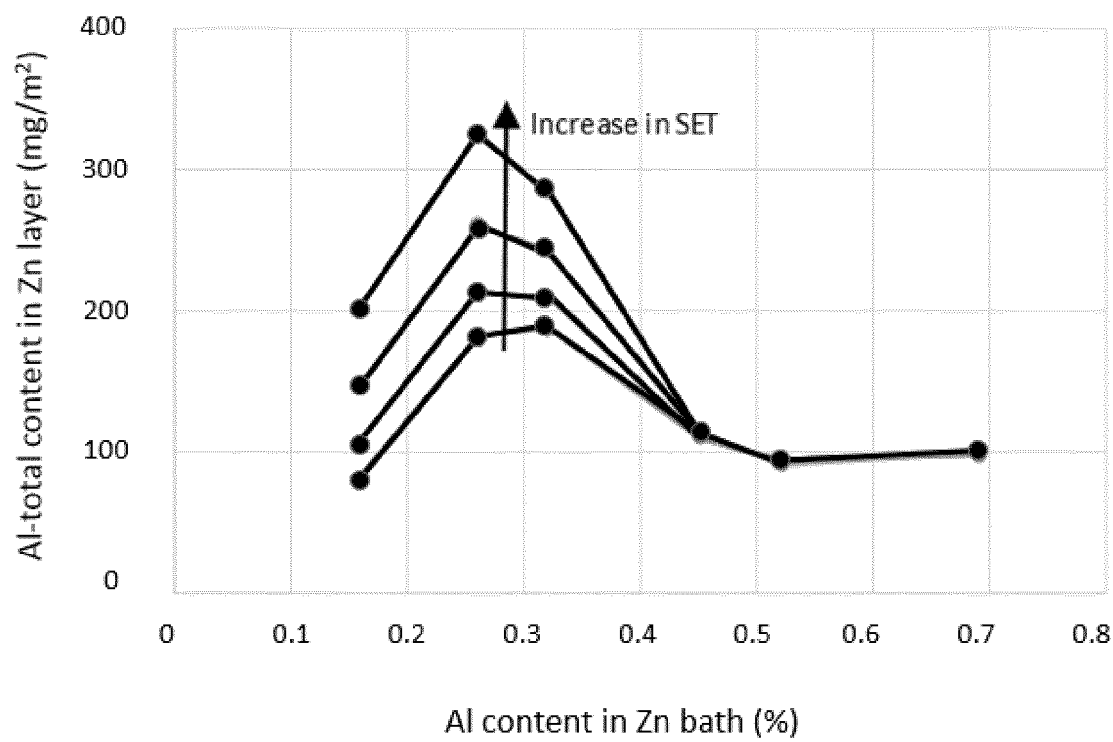
FIG. 2 shows what the inventors found regarding the Al content in the inhibition layer as a function of the SET and the aluminium content in the zinc bath.

The results of the investigations presented in another way show the Al content in the inner layer as a function of the SET and the aluminium content in the bath, see FIG. 2. As is shown, it turns out that from an Al content of 0.50%, the inner layer is stable which is an indication that the inner layer is then fully closed and diffusion of Fe from the substrate to the bath is no longer taking place. This in turn a.o. provides less dross, less surface problems in the product and less high spots in the product.

The Determination of Al, Fe in Outer Layer and Inner Layer

Figure 2A:
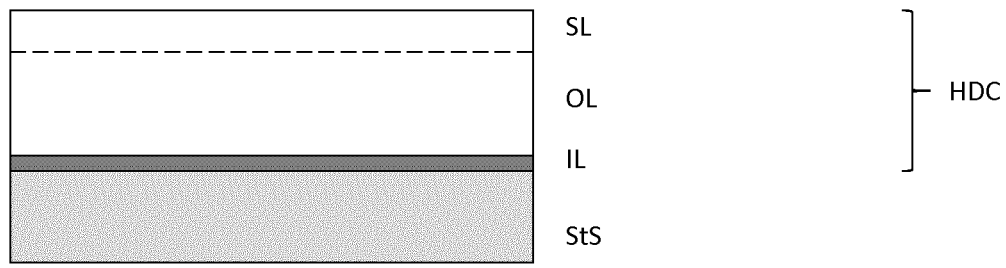
FIG. 2A shows a schematic drawing of a cross section of the build-up of the hot dip coated steel substrate indicating the layers that can be identified.

In FIG. 2A it is explained which three layers, the surface layer SL, the outer layer OL (sometimes also called the overlay) and the inner layer IL (sometimes also called inhibition layer) together make up the total hot dip coated zinc coating on the steel substrate StS. The surface layer can be distinguished from the outer layer by its deviating Al and Fe content.

In order to be able to determine the Al and Fe content in these layers, the following procedure is followed:

In a centre portion of a sample of a material to be analysed (typically having a size of 90×130 mm) a piece of masking tape (typically 60×120 mm) is applied, after which both the top, cut edges and the bottom of the sample are coated by two layers of a protective spray paint. After drying of the paint, the masking tape is removed resulting in a fully protected sample having only an unprotected area the size of the masking tape.

The sample is put horizontally in a petri dish with the unprotected area facing upwards and a hydrochloric acid solution is poured onto the unprotected area, making sure that the unprotected area is fully covered by the acid solution but it is not necessary to immerse the complete specimen in the solution. This acid solution is prepared by immersing 270 ml of concentrated (37%) HCl in 2 litres of deionised water. Also an inhibiter is added to prevent the dissolution of the steel substrate.

After 30 seconds the acid is removed from the sample and the sample is rinsed with deionised water. The acid solution and the water are collected in a flask.

This step is repeated several times, while each time the acid solution and rinsing water are collected in separate flasks, until the dissolution reaction is completely stopped indicating that the Zn coating is fully removed from the surface.

The amount of Zn, Al and Fe in each of the flasks is determined using the ICP-OES (Inductively Coupled Plasma Atomic Emission Spectroscopy) technique. The Zn coating weight, the Al-total and Fe-total can easily be calculated from the results, but also Al and Fe depth profiles, as shown respectively in FIGS. 2B and 2C, can be prepared.

Figure 2B:
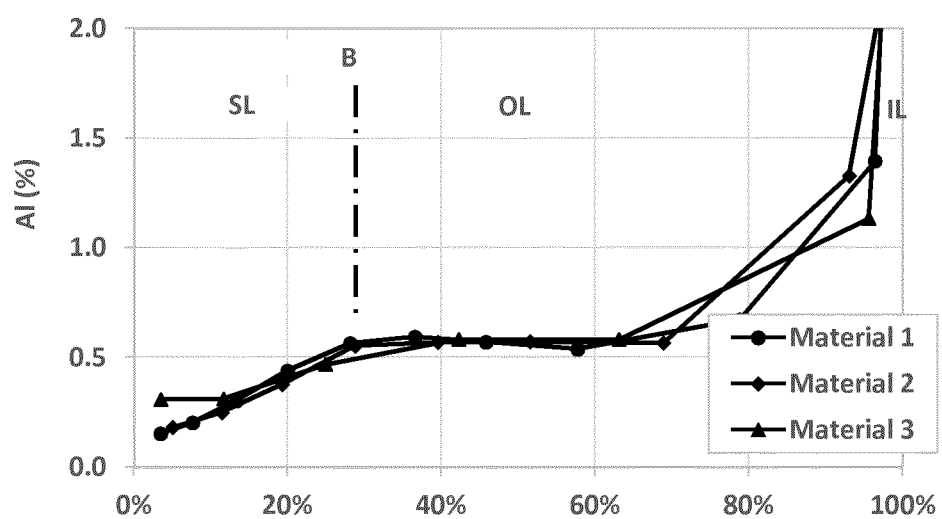
FIG. 2B shows the Al content at different locations in the different layers within the hot dip coating layer and the boundaries between said layers.

The Al content in the different layers SL, OL and IL is determined according to the following procedure referring to FIG. 2B: One takes the average of the Al content at locations between 40% of the thickness of the total coating layer and 60% of the thickness of the total coating layer and designates this as the Al content of the outer layer. Subsequently, a boundary between the surface layer and the outer layer is determined as follows: One goes left from the 40% location and looks for the location where the Al content deviates more than 5% from the abovementioned determined average. This location is regarded as the boundary B between the surface layer and the outer layer. With the boundary B between surface layer and the outer layer known, the amount of Al in the surface layer can subsequently be calculated.

With the assumption that, except for the surface layer, the Al content in the remainder of Zn layer is the same as has been determined with the above procedure for the outer layer, the amount of Al in the inner layer can now be calculated. FIG. 2D gives some examples of this for conventional galvanised materials (Materials 4, 5 and 6) and for materials hot dip coated according to the invention (Materials 1, 2 and 3).

Figure 2C:
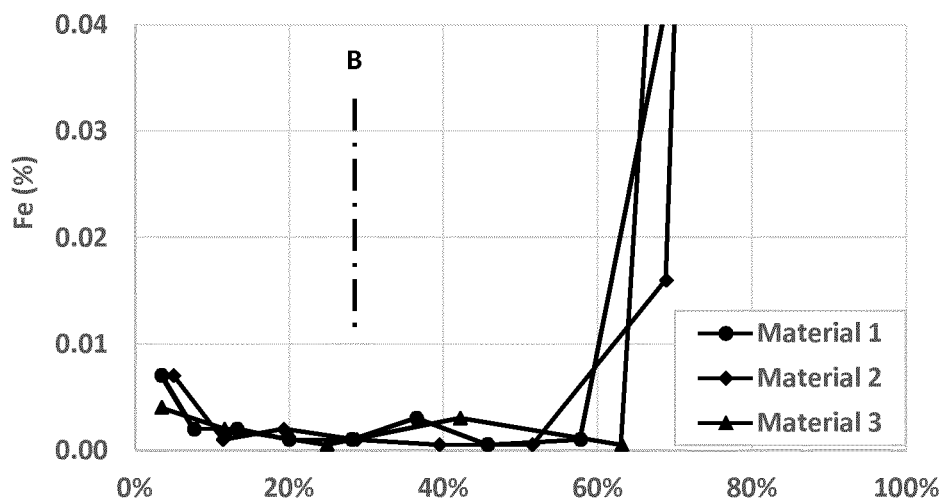
FIG. 2C shows the Fe content at different locations in the hot dip coating layer.
Figure 2D:
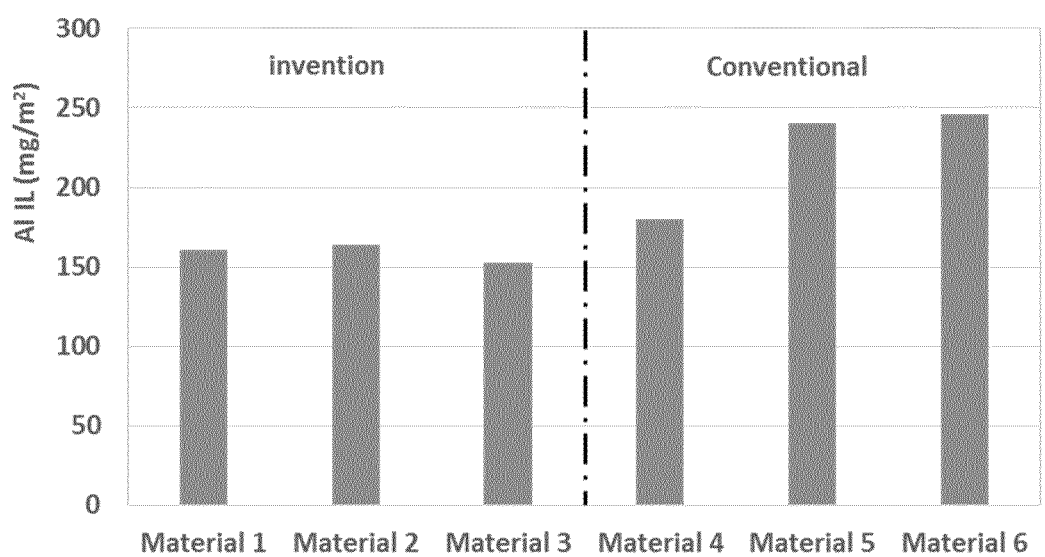
FIG. 2D shows the Al weight in the inner layer of the hot dip coating on one side for materials 1-3 according to the invention and for conventional materials 4-6.

With the identification of the boundary B according to the procedure above, the Fe content in the layers can be calculated in a similar way from the measurements as shown in FIG. 2C.

Hot Dip Coating Parameters

Whenever in the figures the same reference numerals are applied, these numerals refer to the same parts.

The typical flow of manufacturing steps leading to a coated steel sheet, as well as some sequential steps to convert the coated steel sheet of the invention into a press formed and painted automobile body part is known. Casting of a steel slab is followed by hot rolling in a hot strip mill to provide a steel strip, processing in a pickling line, cold rolling in a cold rolling mill, annealing in a continuous annealing line, providing a hot dip coating on the annealed strip in a hot dip coating line, temper rolling in a temper mill, also referred to as skin passing in a skin pass mill, shipping of the product to customers, press forming and painting. Some of these operations can be dispensed with, while it is also possible that some other operations are added to this sequence of events.

Relevant to the invention is particularly what occurs in hot dip coating, although of course the surface quality of the steel that arrives at the cold rolling mill also plays a decisive role in the resulting properties of the final product. It is therefore expressly pointed out that albeit that the disclosure of the instant invention concentrates on the process of hot dip coating, the other processing steps are not without importance and should be maintained at their normal high quality standard.

Figure 3:
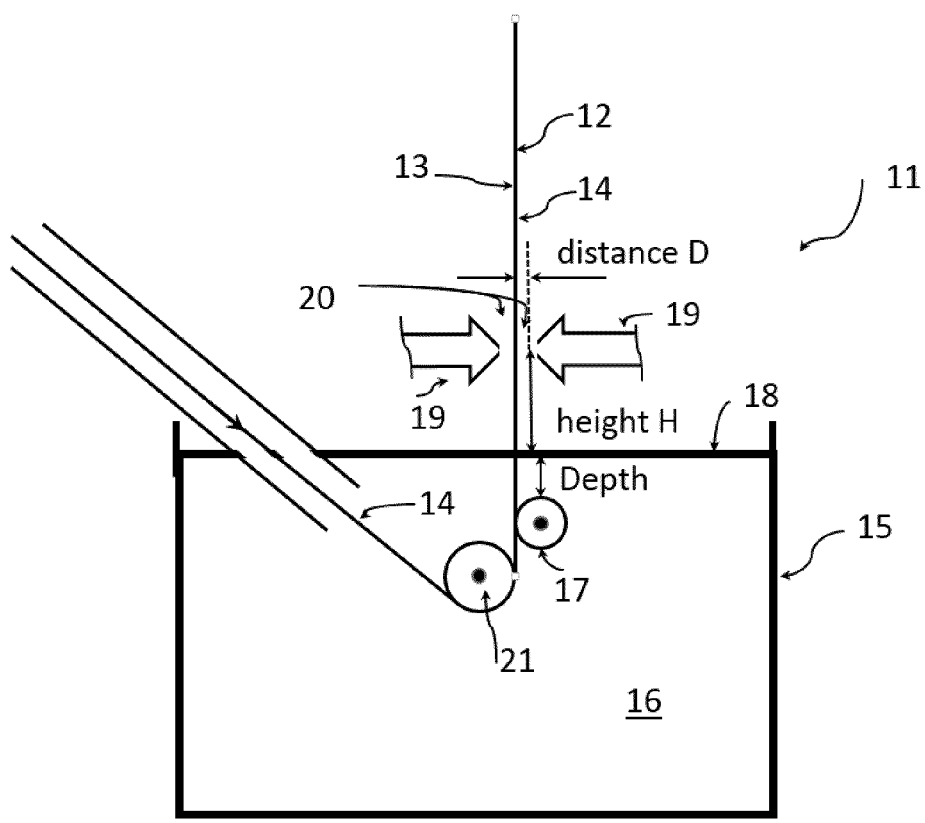
FIG. 3 shows a hot dip coating device.

In general, unless otherwise specified in the tables or text, the settings of the hot dip coating process according to the invention are the following:

Aluminium content in bath of molten metal: approx. 0.6%
D (shortest distance of the outlet of the gas knife to the surface of the strip): 6-12 mm
HS (height of gas knife above the surface of the bath): 200-550 mm
US (distance between upper edge of the roll and surface of the bath): 110-160 mm
P (wiping pressure): 100-600 mbar
V (speed): 60-160 mpm
Ra: 0.6-6.5 µm Turning now to FIG. 3 it shows a part of a hot dip galvanising device 11 to provide a zinc based coating on the surface 12, 13 of a moving steel strip 14, comprising a pot 15 that holds a liquid bath of molten coating material 16 that is to be provided on the moving steel sheet 14.

FIG. 3 shows the application of a stabilization roll 17 and a sink roll 21 to guide the moving steel strip 14 through the bath, wherein the stabilization roll 17 is provided at a predefined depth US indicated in the figure as "Depth" below a surface level 18 of the liquid bath. This US is defined as the distance between the surface level 18 of the liquid bath and an upper edge of the stabilization roll 17. It is remarked that the application of plural or no stabilization rolls is also possible, wherein then the US parameter relates to the uppermost roll touching the strip before it exits the bath.

Above the liquid bath at least one gas knife 19 is provided, which has an outlet 20 to project wiping gas on the coating provided on the surface 12, 13 of the steel strip 14 that passes along the gas knife 19. FIG. 3 shows HS of the gas knife or knives 19 above the liquid bath with reference to its surface level 18, indicated in the figure as "height H", and the distance D of the shown two air knives 19 to the surface of the coated steel strip 14.

The distance D of the at least one gas knife 19 with reference to the passing steel strip 14, the height HS of the at least one gas knife 19 above the liquid bath 16 and US are selected at values so as to satisfy the formula D*ln(HS*US) ≤130 wherein US stands for the depth of the last roll 17 below the surface level 18 of the liquid bath contacting the strip.

Table 1 shows the influence of HS and D on the waviness Wsa determined by measuring in the rolling direction an outer surface of a 5% bi-axially deformed cup-like article made from the coated steel strip 14.

The aluminium content in the bath in the experiments represented in Tables 1-3 was 0.6%.

TABLE 1

| Height HS in mm | D in mm | US in mm | D*ln (HS*US) | Wsa in µm |
|---|---|---|---|---|
| 400 | 7 | 117.5 | 75.3 | 0.28 |
| 400 | 9 | 117.5 | 96.8 | 0.29 |
| 200 | 7 | 117.5 | 70.4 | 0.27 |
| 200 | 9 | 117.5 | 90.6 | 0.30 |
| 400 | 12 | 117.5 | 129.1 | 0.38 |
| 400 | 9 | 117.5 | 96.8 | 0.30 |

It is remarked that it was found that the lower the value of D*ln(HS*US) is, the lower the Wsa will be. It is therefore preferred that the value of D*ln(HS*US) is equal to or lower than 120, 110, 100, 90, 80, 70.

Table 2 shows the influence of the height HS of the gas knife 19 above the liquid bath and the depth US of the at least one stabilizing roll 17 below the surface level 18 of the liquid bath.

TABLE 2

| Height HS in mm | D in mm | US in mm | D*ln (HS*US) | Wsa in µm |
|---|---|---|---|---|
| 550 | 8 | 120 | 88.8 | 0.28 |
| 500 | 8 | 130 | 88.7 | 0.28 |
| 550 | 8 | 130 | 89.4 | 0.29 |
| 550 | 8 | 135 | 89.7 | 0.29 |
| 505 | 8 | 140 | 89.3 | 0.28 |
| 550 | 8 | 150 | 90.6 | 0.31 |

It follows from table 1 and table 2 that preferably the distance D of the at least one gas knife 19 to the passing steel sheet 14 is 9 mm or less, preferably 8 mm or less and more preferably 7 mm or less, and the height HS of the at least one gas knife above the liquid bath of the zinc based coating and the value of US is then selected in accordance with the invention so as to achieve optimal results regarding the Wsa of the resulting hot dip coated steel.

Alternatively it follows from table 1 and table 2 that the height HS of the at least one gas knife 19 above the liquid bath of the zinc based coating 16 is 550 mm or less, preferably 400 or less, preferably 300 mm or less, more preferably 250 mm or less, and even more preferably 200 mm or less, and the distance D is selected in accordance with the invention.

Table 3 shows the repeatability of the attainable Wsa values if the invention is practised.

TABLE 3

| Sample id | Height HS in mm | D in mm | Depth US in mm | Wsa in μm |
|---|---|---|---|---|
| A | 500 | 8 | 150 | 0.23 |
| B | 500 | 8 | 150 | 0.24 |
| C | 500 | 8 | 150 | 0.24 |
| D | 500 | 8 | 150 | 0.24 |
| E | 500 | 8 | 150 | 0.27 |
| F | 500 | 8 | 150 | 0.25 |
| G | 500 | 8 | 150 | 0.25 |
| H | 500 | 8 | 150 | 0.27 |
| I | 500 | 8 | 150 | 0.24 |
| J | 500 | 8 | 150 | 0.24 |
| K | 500 | 8 | 150 | 0.25 |

In all the above cases in Table 3 D*ln(HS*US) is 89.80

The method of coating a steel sheet according to the invention resulted in a batch of coated steel sheets with an average waviness value Wsa of 0.25 μm o. It should be mentioned here that in some samples even a value as low as 0.22 μm was found. In all these cases Wsa stands for the waviness found on the outer surface of a 5% bi-axially deformed cup-like article made from a part of hot dip coated steel (made) according to the invention, measured in the rolling direction (RD).

Figure 4:
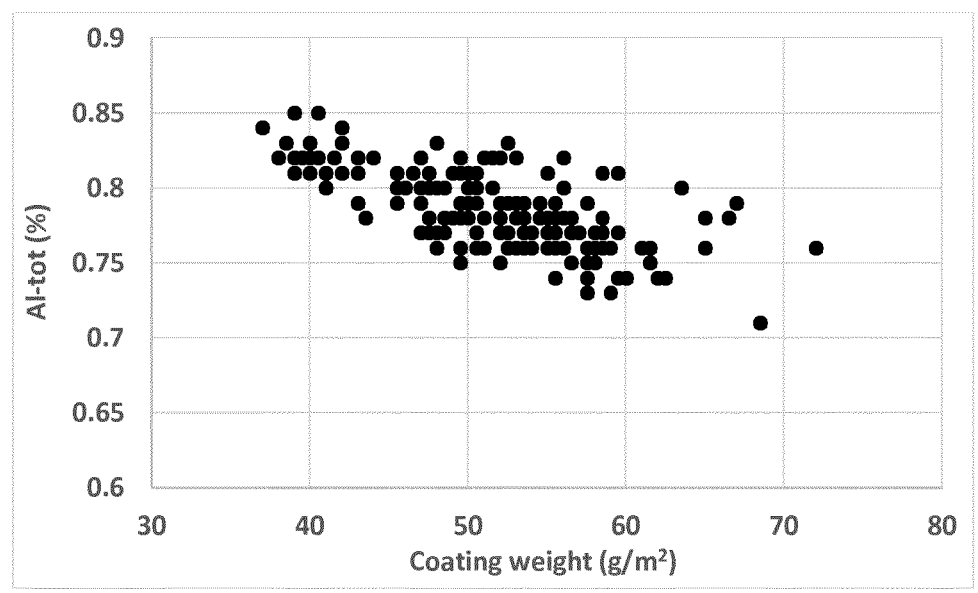
FIG. 4 shows the Al-total content in the hot dip coating layer of samples of hot dip coated steels manufactured according to the invention as a function of the coating weight (per side)

In FIG. 4 the results of manufacturing hot dip coated steels according to the invention are shown. The samples were made using steel substrates like DX52, DX54 and BH180 and the process settings were chosen according to the invention and such that different coating weights were realised, the coating weights varying from 35 to 75 g/m2 (per side). As is seen in FIG. 4, the Al-content in the total hot dipped coating layer was in the range of 0.71% to 0.86%. In FIG. 2B the Al-content in the outer layer (OL) for three sample materials manufactured according to the invention is provided. It can been seen that the Al content of the outer layer was about 0.6%.

Here the inventors wish to elucidate their views on the subject of waviness in relation to hot dip coated products. The surface waviness of a formed final article is the result of the surface waviness of the undeformed, i.e. flat steel sheet, and the waviness change introduced by the forming of the article. The difference between the waviness of the formed article and the waviness of the undeformed steel sheet is referred to as the delta waviness, ΔWsa. Due to the specific nature of the production process for steel strip, the formed surface shows a line like pattern, in which the lines are perpendicular to the rolling direction. An implication of this observation is that the delta waviness is higher in the rolling direction (RD) than in other directions, the direction perpendicular to RD being indicated as transverse direction (TD). This directional effect is strongly present in paint appearance values as well and therefore it is of importance that delta waviness in the rolling direction is minimised.

These patterns are caused by minor, local hardness differences in the substrate leading to inhomogeneous deformation in the forming step and thus to height differences in turn leading to a waviness increase. These hardness differences arise when the grains in the substrate are insufficiently small or when the waviness before the temper mill is too high. In this latter case the higher areas are pushed into the substrate by the temper rolling operation leading to local hardness differences.

Figure 9:
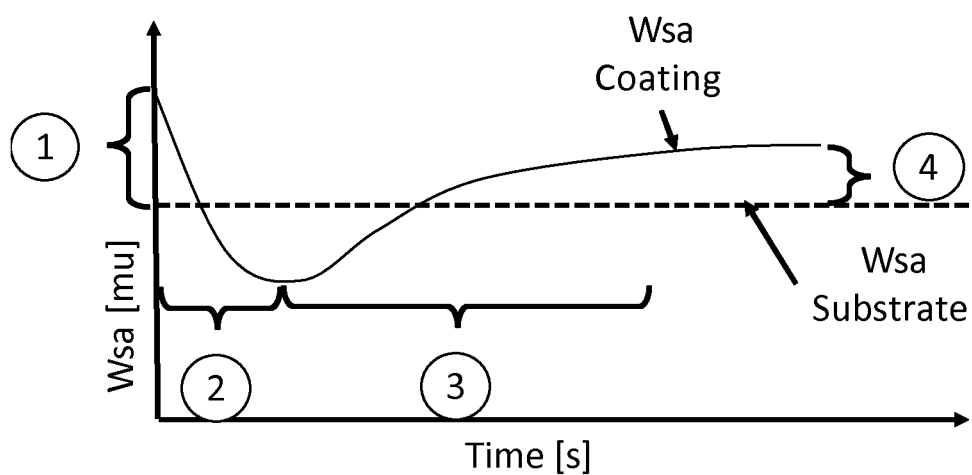
FIG. 9 shows the waviness development from just after the gas knives until solidification.

According to the invention the waviness before the temper mill is reduced to ensure that the waviness increase during forming is limited, or not present at all. The level of waviness of the hot dip coated layer before temper rolling is related to levelling of the surface of the coating due to an interaction between surface tension and gravitational forces. To understand this better a schematic representation of waviness development from the gas knives until solidification is discussed with reference to FIG. 9.

First, at the gas knives the hot dip coating layer is reduced to its desired thickness. Due to the high turbulent nature of the gas stream projected by the wiping knives, the coating surface will have a waviness which is higher than the original substrate waviness (see 1 in FIG. 9). In the first few moments after the strip passes the knives the surface tension will level the surface, leading to a drop in the waviness (see 2 in FIG. 9). It may be noted that longer waves are decaying more slowly than shorter waves, making it critical to ensure that at the knives no waves are created that have a high wavelength. After this initial levelling the coating starts to move downwards. Although the downward speed is very low it is believed to have a significant effect on the waviness as the coating starts to conform itself to the original substrate surface (see 3 in FIG. 9). The final waviness of the coating is determined the moment the coating solidifies. The difference between coating waviness and the substrate waviness is indicated by 4 in FIG. 9.

The final waviness of the hot dip coating before the temper mill is shown schematically in FIG. 10. The difference between the substrate and coating waviness (see 2 in FIG. 10) is determined by the equilibrium of surface tension and gravity. Lowering the substrate waviness has a very positive influence on the coating waviness, however it levels out for a very low substrate waviness. The final level is indicated by 1 in FIG. 10 and is primarily determined by the knife influence.

According to the different aspects of the invention several deleterious effects are successfully minimized which in combination lead to a superior surface quality in particular as regards waviness. An explanation of the effect of increased aluminium in the zinc bath may be that the turbulence of the gas from the gas knife is better handled by the coating according to the invention due to a changed fluidity of the coating when it passes the knives. The fluidity of a molten metal is inversely proportional to the freezing range, in other words the longer the freezing range the lower the fluidity. For zinc—aluminium alloys the fluidity is shown in FIG. 11. It is clear that the fluidity decreases for additions of aluminium. For higher aluminium contents in the bath, e.g. higher than 0.5%, the fluidity may be low enough to ensure that zinc segregation already takes place within the impact zone of the gas from the knife due to the high heat transfer. This increases the viscosity within this area significantly which in turn ensures that the effect of pressure fluctuations of the knives is minimized and as such that the waviness increase due to the wiping process is lowered. After the knives the segregated zinc melts again and lowers the viscosity enough to ensure a good levelling.

Further improvements to obtain excellent waviness are described above and in the claims.

TABLE 4

Wsa values in μm at different stages

| | Substrate WsaSUBSTR | Hot dip coating WsaNTR | Delta ΔWsaKNIVES | Wsa Flat TR | Wsa Formed | Delta Wsa |
|---|---|---|---|---|---|---|
| RD | 0.166 | 0.216 | 0.050 | 0.198 | 0.226 | 0.028 |
| TD | 0.097 | 0.145 | 0.049 | 0.246 | 0.238 | −0.008 |

In table 4 examples are given of values of waviness Wsa, all measured in the rolling direction, of the cold rolled steel substrate before hot dip coating, of the hot dip coated surface before temper rolling (non-temper-rolled NTR), of the flat non-deformed hot dip coated steel according to the invention, and of an outer surface of a 5% bi-axially deformed cup-like article made from the coated steel according to the invention.

If the invention is followed then the Waviness Wsa of the hot dip coating before temper rolling (WsaNTR) is closely related to the waviness Wsa of the substrate (WsaSUBSTR). In particular, when the waviness difference between WsaNTR and WsaSUBSTR is defined as ΔWsaKNIVES= WsaNTR−WsaSUBSTR we find that the following relation holds:

$$\Delta Wsa\text{KNIVES} < \text{MAX}(0.06; 0.16 - 0.6 * Wsa\text{SUBSTR}),$$

see the examples in table 5.

TABLE 5

| Sample | WsaSUBSTR | WsaNSKP | ΔWsaKNIVES |
|---|---|---|---|
| 1 | 0.166 | 0.216 | 0.050 |
| 2 | 0.166 | 0.220 | 0.054 |
| 3 | 0.507 | 0.324 | −0.144 |

Figure 5:
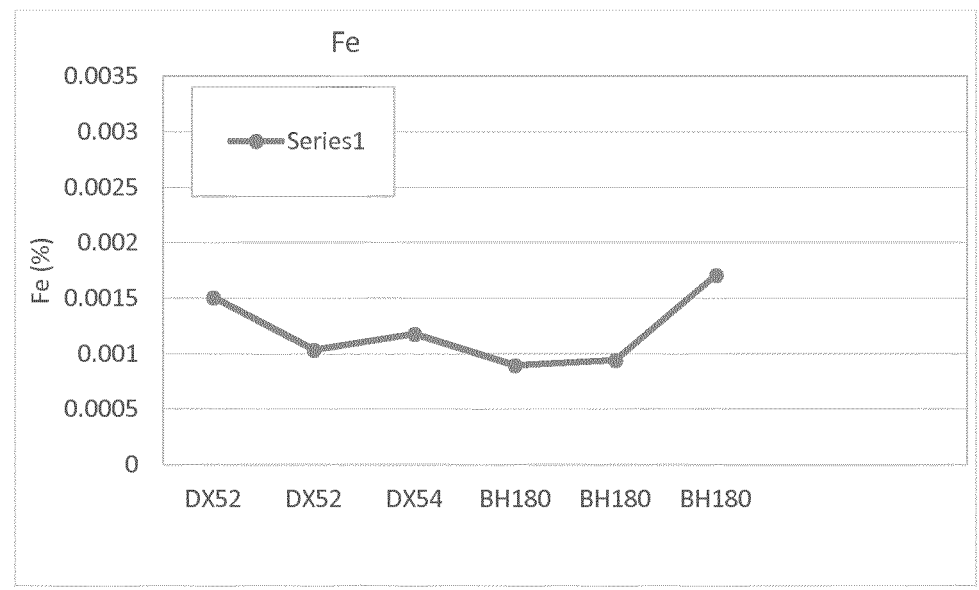
FIG. 5 shows the Fe-content of the outer layer of the hot dip coating layer of hot dip coated steel samples manufactured according to the invention.
Figure 5A:
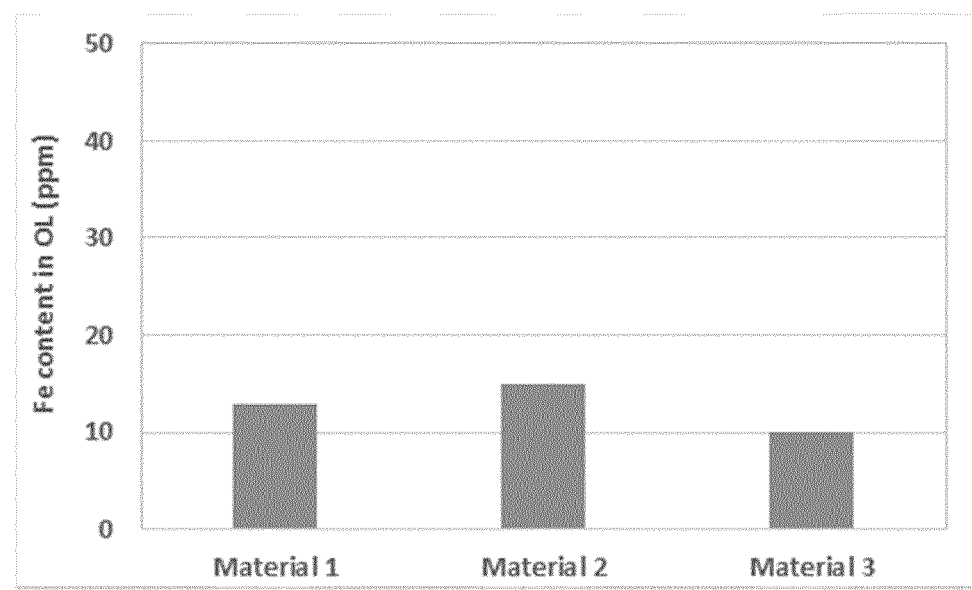
FIG. 5A shows the Fe-content in the outer layer of the hot dip coating layer of hot dip coated steel materials manufactured according to the invention.

In FIG. 5 and in FIG. 5A the results of measurements of the Fe-content of the outer layer of hot dip coated steels manufactured according invention are shown. As was expected in view of the findings and deliberations of the inventors, the Fe content in the outer layer of the product is very low, in the tested samples it was below 20 ppm. However, it should be mentioned that satisfactory products may also be obtained if the Fe content is lower than 30 ppm, 50 ppm and 70 ppm. DX52 stands for DX52D+Z and DX54 for DX54D+Z and BH180 for HX180BD+Z (see EN10346: 2015).

In order to understand the final properties of the hot dip coated steel product according to this invention the inventors have taken into account what happens during solidification of the coating layer. Hereto the phase diagram of aluminium—zinc was considered, see FIG. 12. During cooling of the liquid zinc coating after having passed the gas knives zinc segregates first, followed by aluminium and the remainder of the zinc in case the aluminium percentages are below 1.1%.

At higher Aluminium percentages ZnAl phases are formed, which are unwanted as they can deteriorate the surface quality. Under non-equilibrium situations, as is the case for the typical very high cooling rates of the coating during wiping, ZnAl phases were found at Al percentages of 1.0%. It is for this reason that it is better to keep the Aluminium percentage well below 1.0%, namely below 0.9% or possibly even better below 0.8% to ensure that only insignificant amounts of ZnAl phases are generated.

To test galling behaviour, experiments were performed in which a coated strip is pulled between two tools which are pushed together with a certain force.

Figure 8:
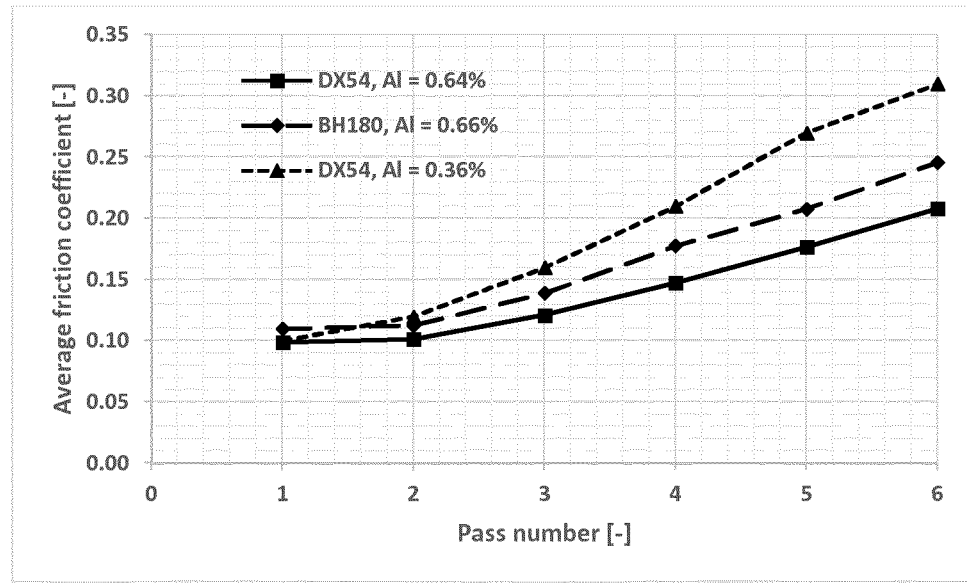
FIG. 8 shows the galling performance of hot dip coated steels according to the invention compared to conventionally hot dip galvanised steels.

To mimic a press operation in the best way flat and cylindrical tools are used, both having a predefined roughness (Ra) of 0.4 μm. This operation is repeated 6 times, without re-oiling between the subsequent passes, to get a similar build up as normally found in the press shop. The results are shown in FIG. 8. Of the three lines the line with the triangular data points represents the galling behaviour of a DX54 conventionally galvanised, the line with the diamond shaped points represents that of a BH180 hot dip coated in a bath with an aluminium content of 0.66% and the line with the squares as data points represents the galling behaviour of a DX54 hot dip coated in a bath with an aluminium content of 0.64%.

The inventors found that the coefficient of friction is not increasing after 2 passes for the material with a higher Al percentage, whereas the reference does. This result is extremely good and belongs to the best found in performing this testing work. Also after all subsequent passes the coefficient of friction increases less strongly than the reference material, showing the superiority of the product according to this invention.

Figure 7:
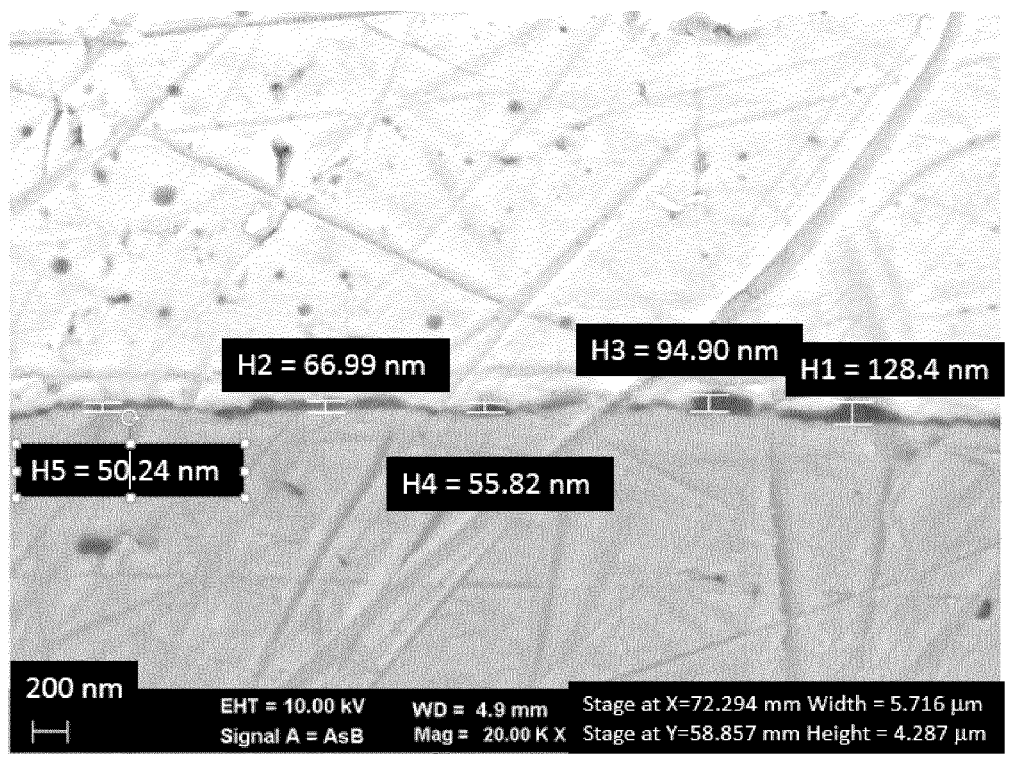
FIG. 7 shows a cross section through a hot dip coated steel sheet with a view of the steel substrate (partly), the inner layer and the outer layer.

The spot welding results for the steel product according to the invention are very good. This may be related to the small thickness of the inhibition layer. In FIG. 7 the build-up of the coating layer can be seen. The grey area on the bottom of the picture represents the steel substrate, and the white to light grey area on the top of the picture represents the outer layer. In between the very thin inhibition layer (dark grey layer) can be seen having thicknesses in different places of 50.24 nm, 66.99 nm, 55.82 nm, 94.90 nm and 128.4 nm respectively.

Among the investigations there was an extensive adhesive bonding test programme in accordance with SEP1220-6. It turns out that the products according to the invention compared to conventional galvanised products perform equally well or better regarding shear strength, shear results and peel results.

Figure 6:
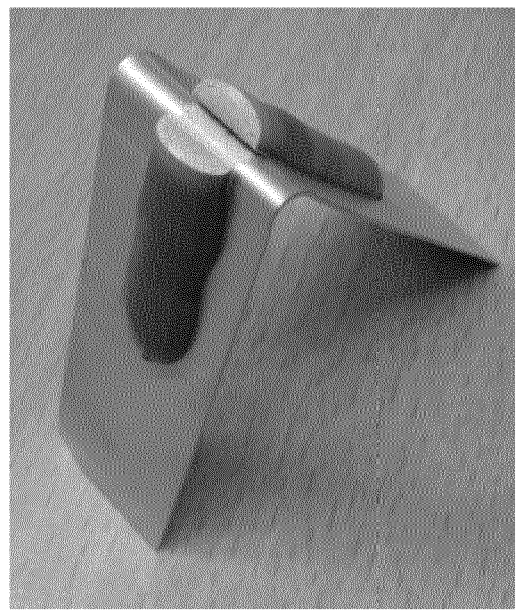
FIG. 6 shows a test piece that passed the most severe OEM test for adhesion of the hot dip coating to the steel substrate.

FIG. 6 shows a test sample according to the invention which (as all samples tested) passed successfully the most severe OEM test regarding adhesion of the coating layer to the steel substrate.

In summary in performing their inventive work including extensive research and development, the inventors have found that in the field of the invention surprisingly the inhibition layer does not get thicker if one raises the aluminium content in the zinc bath, but thinner. This is advantageous because a thinner layer is more ductile and gives better electrode lifetime. This is also advantageous because it makes the hot dip coating operation independent of SET. The thin inhibition layer gives optimal coating adhesion, and good electrode life time in spot welding. The higher aluminium in the outer layer provides better galling behaviour, possibly because the layer has a greater hardness. Finally the higher aluminium gives the coating a different viscosity and solidifying behaviour which proves to be advantageous for manufacturing and in particular for the resulting coated product especially also regarding waviness.

The invention is carried out by preference in combination with a steel substrate that has a composition, all in weight %, having C max 0.007, Mn max 1.2, Si max 0.5, Al max 0.1, P max 0.15, S 0.003-0.045, N max 0.01, Ti, Nb, Mo: if Ti≥0.005 and Nb≥0.005:0.06≤4Ti+4Nb+2Mo≤0.60 otherwise 0.06≤Ti+2Nb+2Mo≤0.60, and one or more of the optional elements: Cu max 0.10, Cr max 0.06, Ni max 0.08, B max 0.0015, V max 0.01, Ca max 0.01, Co max 0.01, Sn max 0.01, the remainder being iron and unavoidable impurities.

Finally it is remarked that in the formula's *stands for multiplication, ^ for exponentiation and ÷ for division.

The invention claimed is:

1. A hot dip coated steel comprising a steel substrate and a Zn—Al coating layer, said coating layer comprising a surface layer, an inner layer immediately adjacent the steel substrate and an outer layer extending from the surface layer of the coated steel to the inner layer, wherein the aluminium content in the outer layer is in the range of 0.4-1.0 weight % and the aluminium content of the total Zn—Al coating layer is 0.71-0.95 weight %,
wherein the outer surface of a 5% bi-axially deformed cup-like article made from the coated steel has a Wsa measured in the rolling direction of 0.35 µm or less.

2. The hot dip coated steel according to claim 1, adapted and configured for use in automotive parts.

3. The hot dip coated steel according to claim 1, adapted and configured for full finish exposed purposes for automotive hoods, automotive fenders, automotive doors, or automotive body panels.

4. The hot dip coated steel according to claim 1, wherein the coating layer consists of Al, the remainder of the coating layer being Zn, inevitable impurities and optionally a maximum total of 0.3 weight % of one or more additional elements.

5. The hot dip coated steel according to claim 4, wherein the one or more additional element(s) is/are Si, Sb, Pb, Ti, Ca, Mn, Mg, Sn, La, Ce, Cr, Zr or Bi.

6. The hot dip coated steel according to claim 1, wherein the Fe-content in the outer layer is less than 70 ppm based on weight.

7. The hot dip coated steel according to claim 1, wherein the inner layer has an aluminium content of less than 165 mg/m$^2$.

8. The hot dip coated steel according to claim 1, wherein the aluminium content of the Zn—Al coating layer is 0.72 weight % or more.

9. The hot dip coated steel according to claim 1, wherein the aluminium content of the Zn—Al coating layer is 0.75 weight % or more.

10. The hot dip coated steel according to claim 1, wherein the aluminium content of the Zn—Al coating layer is 0.90 weight % or less.

11. The hot dip coated steel according to claim 1, wherein the outer surface of the 5% bi-axially deformed cup-like article made from the coated steel has a Wsa measured in the rolling direction of 0.32 µm or less.

12. The hot dip coated steel according to claim 1, wherein the Fe-content in the outer layer is less than 20 ppm based on weight.

13. The hot dip coated steel according to claim 1, wherein the inner layer has an aluminium content of less than 120 mg/m$^2$.

14. The hot dip coated steel according to claim 1, wherein the outer surface of the 5% bi-axially deformed cup-like article made from the coated steel has Wsa measured in the rolling direction of 0.26 µm or less.

15. A method of manufacturing a hot dip coated steel according to claim 1 comprising a steel substrate and a Zn—Al coating layer, said coating layer comprising a surface layer, an inner layer immediately adjacent the steel substrate and an outer layer extending from the surface layer of the coated steel to the inner layer, wherein the aluminium content in the outer layer is in the range of 0.4-1.0 weight % and the aluminium content of the total Zn—Al coating layer is 0.71-0.95 weight %,
wherein the outer surface of a 5% bi-axially deformed cup-like article made from the coated steel has a Wsa measured in the rolling direction of 0.35 µm or less,
wherein coating of the steel substrate takes place by leading a strip of the steel substrate through a bath of molten metal comprising Al, the remainder of the metal being Zn, inevitable impurities and optionally a maximum of in total 0.3 weight % of one or more additional elements, wherein the composition of the bath is controlled so as to have an aluminium content of more than 0.50 weight %.

16. The method according to claim 15, wherein the one or more additional elements is/are selected from Si, Sb, Pb, Ti, Ca, Mn, Mg, Sn, La, Ce, Cr, Zr or Bi.

17. The method according to claim 15 wherein the composition of the bath is controlled so as to have an aluminium content of 0.55 weight % or more.

18. The method according to claim 15 wherein the composition of the bath is controlled so as to have an aluminium content of 0.6 weight % or more.

19. The method according to claim 15, wherein the composition of the bath is controlled so as to have an aluminium content of 1.1 weight % or less.

20. The method according to claim 15, wherein the composition of the bath is controlled so as to have an aluminium content of 1.0 weight % or less.

21. The method according to claim 15, wherein the composition of the bath is controlled so as to have an aluminium content of 0.9 weight % or less.

22. The method according to claim 15, wherein the composition of the bath is controlled so as to have an aluminium content of 0.8 weight % or less.

23. The method according to claim 15, wherein the Fe-content in the bath is less than 90 ppm based on weight.

24. The method according to claim 15, comprising leading the strip to the exit of the bath via a roll below the surface level of the bath and wiping the strip leaving the bath with at least one gas knife projecting through at least one outlet a wiping gas on the coated steel strip, wherein the parameters D, HS and US are selected such that $$D*ln(HS*US) \leq 130,$$

wherein D is the shortest distance of the outlet of the gas knife to the surface of the strip in mm, HS is the height of the gas knife above the surface of the bath in mm, US is the distance between the upper edge of the roll and the surface of the bath in mm.

25. The method according to claim 24, wherein D*ln(HS*US) is 120 or less.

26. The method according to claim 25, wherein D is 9 mm or less.

27. The method according to claim 24, wherein D is 9 mm or less.

28. The method according to claim 24, wherein HS is 550 mm or less.

29. The method according to claim 24, wherein the steel strip before it is hot dip coated is cold rolled in a cold rolling mill having a mill stand with a pair of work rolls having a predefined roughness Ra, wherein Ra for each roll is 4.5 µm or less.

30. The method according to claim 24, wherein D*ln(HS*US) is 70 or less.

31. The method according to claim 24, wherein HS is 200 mm or less.

32. The method according to claim 24, wherein the steel strip before it is hot dip coated is cold rolled in a cold rolling mill having a mill stand with a pair of work rolls having a predefined roughness Ra, wherein Ra for each roll is 0.6 μm or less.

33. The method according to claim 15, comprising wiping the strip leaving the bath with at least one gas knife projecting through at least one outlet a wiping gas on the coated steel strip, wherein hot dipping and wiping are conducted in such a way that $$[(P-24) \div (5.95 D^{0.96} V^{1.39})]^{-0.81} \leq 150,$$

wherein P is the wiping pressure in the gas knife in mbar, D is the shortest distance of the outlet of the gas knife to the surface of the strip in mm and V is the speed of the strip in m/min.

34. The method according to claim 33, wherein D is 9 mm or less.

35. The method according to claim 5, comprising wiping the strip leaving the bath with at least one gas knife projecting through at least one outlet a wiping gas on the coated steel strip, wherein hot dipping and wiping are conducted in such a way that $$[(P-24) \div (5.95 D^{0.96} V^{1.39})]^{-0.81} \leq 100,$$

wherein P is the wiping pressure in the gas knife in mbar, D is the shortest distance of the outlet of the gas knife to the surface of the strip in mm and V is the speed of the strip in m/min.

36. The method according to claim 35, wherein $$[(P-24) \div (5.95 D^{0.96} V^{1.39})]^{-0.81} \leq 60.$$

37. The method according to claim 35, wherein D is 9 mm or less.

38. The method according to claim 35, wherein $$[(P-24) \div (5.95 D^{0.96} V^{1.39})]^{-0.81} \leq 70.$$

39. The method according to claim 38, wherein D is 9 mm or less.

40. The method according to claim 15, wherein the Fe-content in the bath is less than 20 ppm based on weight.

\* \* \* \* \*